Figure 5:
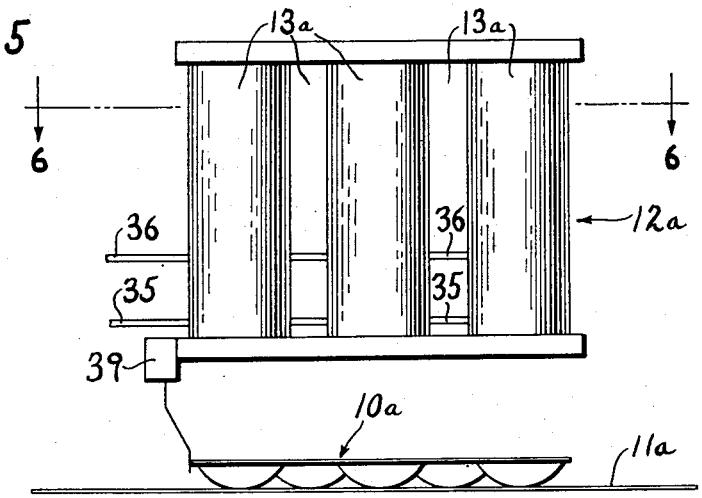

May 6, 1958     C. F. STUART     2,833,095
PACKING
Filed May 19, 1953     5 Sheets-Sheet 1
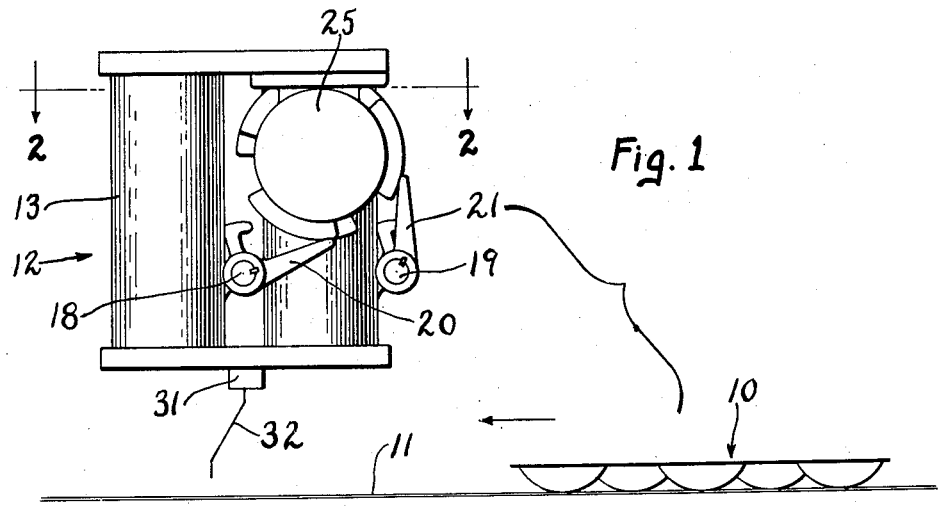
Fig. 1
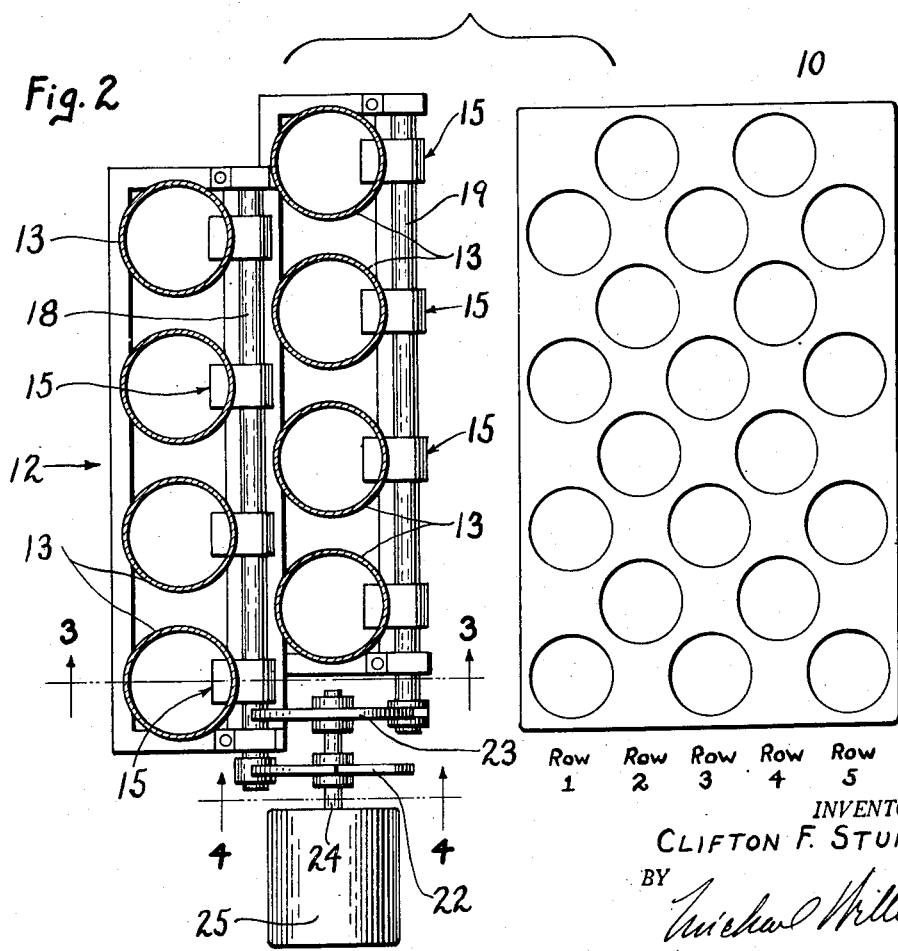
INVENTOR.
CLIFTON F. STUART
BY
Attorney May 6, 1958  
C. F. STUART  
2,833,095  
PACKING  
Filed May 19, 1953  
5 Sheets-Sheet 2
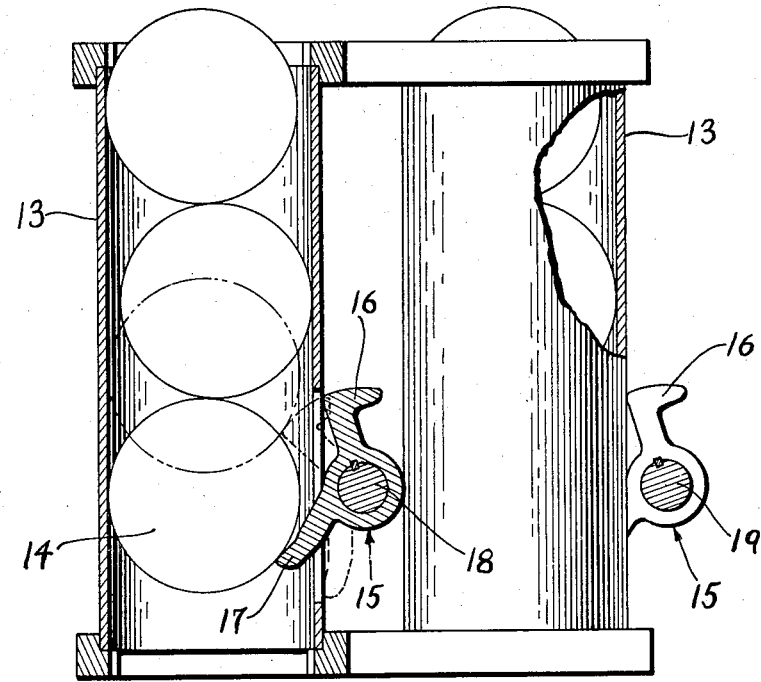
Fig. 3
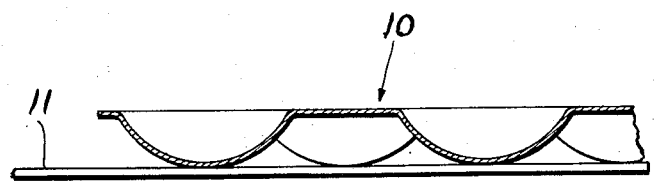
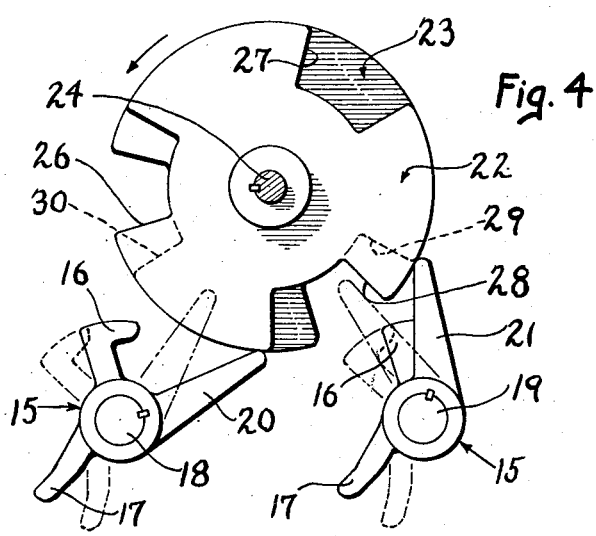
Fig. 4
INVENTOR.  
CLIFTON F. STUART  
BY  
*Michael Williams*  
Attorney May 6, 1958 C. F. STUART 2,833,095
PACKING
Filed May 19, 1953 5 Sheets-Sheet 3

INVENTOR.
CLIFTON F. STUART
BY
*Michael Williams*
Attorney

May 6, 1958 C. F. STUART 2,833,095
PACKING
Filed May 19, 1953 5 Sheets-Sheet 4
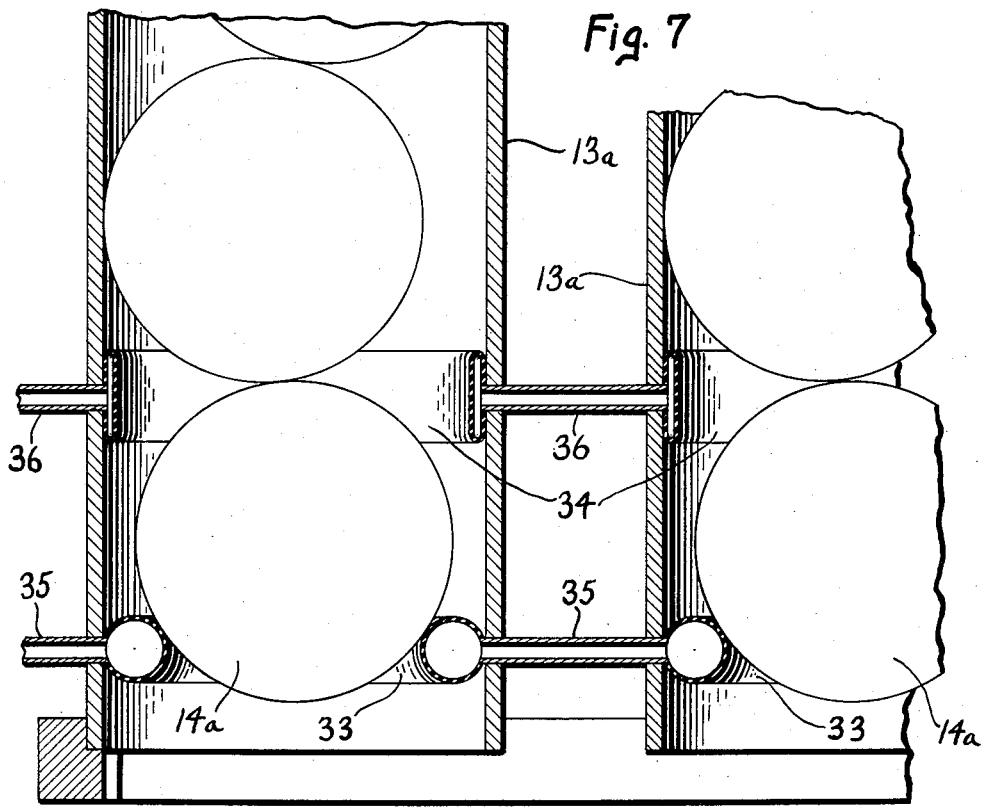
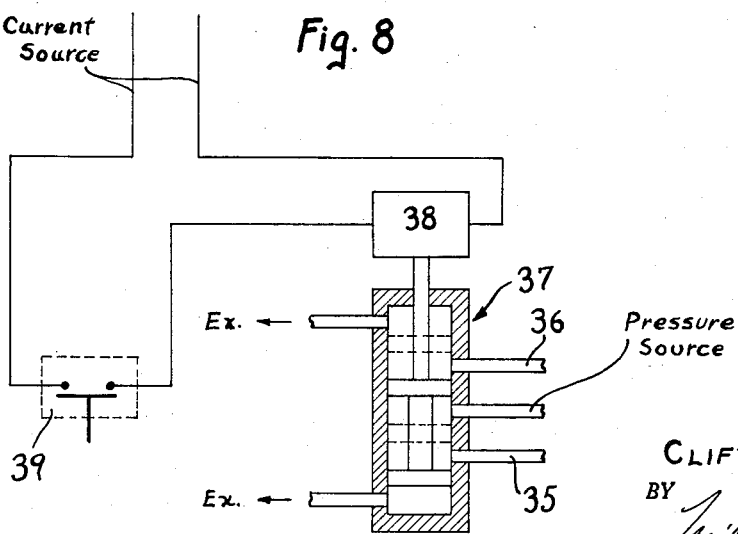
INVENTOR.
CLIFTON F. STUART
BY
Attorney May 6, 1958 C. F. STUART 2,833,095
PACKING
Filed May 19, 1953 5 Sheets-Sheet 5

INVENTOR.
CLIFTON F. STUART
BY
Attorney

United States Patent Office 2,833,095
Patented May 6, 1958

2,833,095

PACKING

Clifton F. Stuart, Warren, Ohio, assignor to Clifton-Grant Development Corporation, Warren, Ohio, a corporation of Ohio Application May 19, 1953, Serial No. 355,991

11 Claims. (Cl. 53—35)

My invention relates to packing, more particularly to methods of and apparatus for packing fruit and the like, and the principal object of my invention is to provide new and improved apparatus of the character described.

Handling and packing fruit has long been an expensive process since it has been done largely by hand. Machines have been employed to wash fruit and sort it according to size, and conveyor belts and the like have been employed to transport the fruit between various processing stages; however, no one has heretofore devised a machine that will satisfactorily pack fruit.

It has been found that fruit may be packed in a box more tightly and with less danger of bruising if it is packed in layers separated by papier-mache or the like. Accordingly, it has been common practice to first pack the fruit in shallow papier-mache trays having pockets for receiving the fruit in a predetermined pattern and then stacking the trays in a box for shipment.

One of the objects of my invention is to provide apparatus that will fill the aforementioned trays, or trays of any other suitable kind or type, with fruit to thus eliminate an expensive hand operation. This and other advantages will become apparent from a study of the following description and of the drawings appended hereto. It will be apparent that my invention may be used to pack or position articles other than fruit and the term fruit is hereinafter used only as a means of designating one of the many articles which may be packed or positioned through use of my invention.

Figure 6:
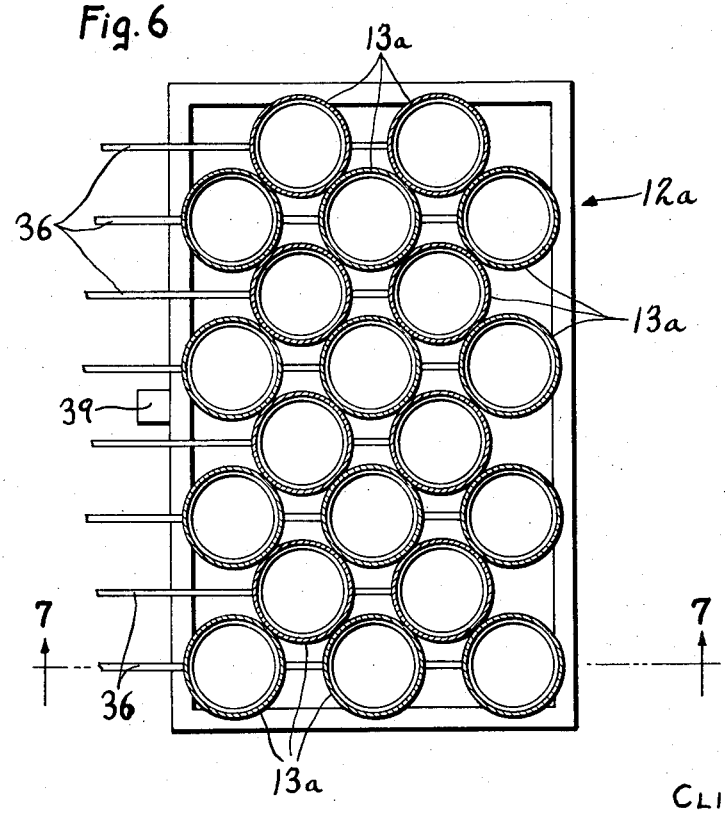
Figure 9:
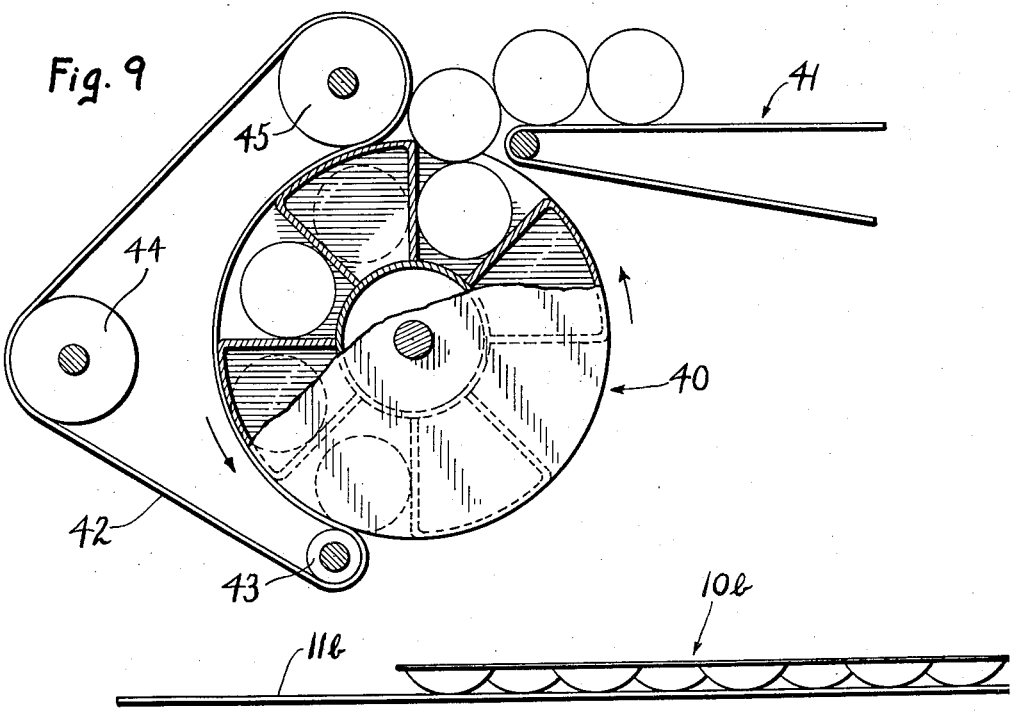
Figure 10:
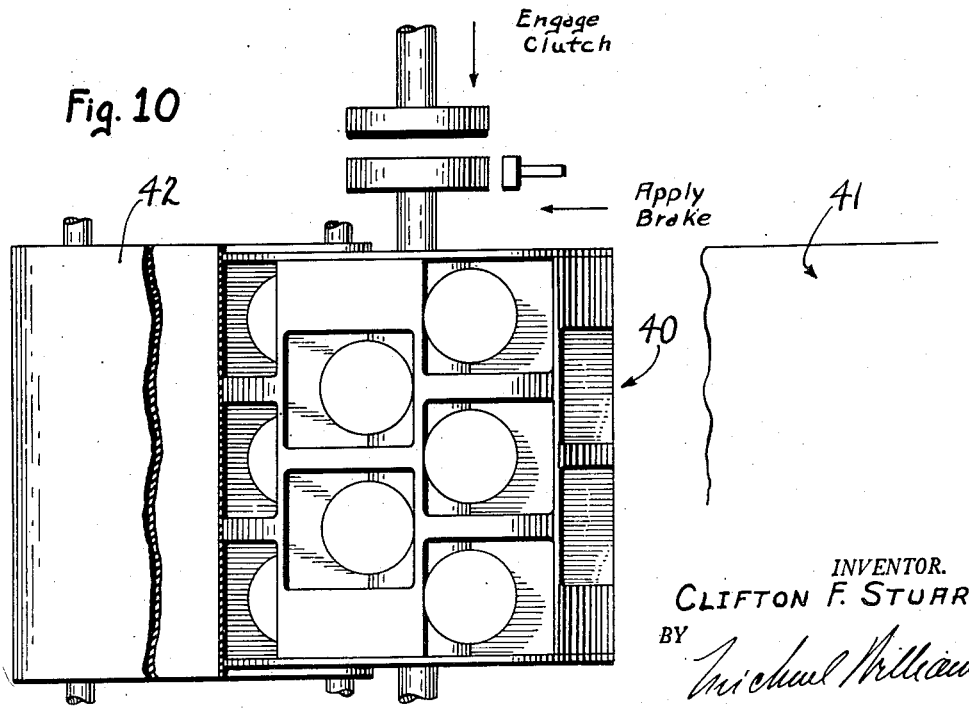

In the drawings accompanying this specification and forming a part of this application there are shown, for purpose of illustration, several embodiments which my invention may assume, and in these drawings:

Figure 1 is a fragmentary side elevational view of an embodiment of my invention, Figure 2 is a horizontal sectional view corresponding generally to the line 2—2 of Figure 1, Figure 3 is an enlarged, fragmentary sectional view generally corresponding to the line 3—3 of Figure 2, Figure 4 is an enlarged sectional view generally corresponding to the line 4—4 of Figure 2, certain parts being omitted in the interest of clarity, Figure 5 is a fragmentary side elevational view of a modified form of my invention, Figure 6 is a sectional view generally corresponding to the line 6—6 of Figure 5, Figure 7 is an enlarged, fragmentary sectional view generally corresponding to the line 7—7 of Figure 6, Figure 8 is a diagrammatic representation of means employed to control operation of the embodiment of the invention shown in Figures 5, 6 and 7, Figure 9 is a fragmentary, side elevational view of still another embodiment of my invention, certain portions being broken away to better illustrate interior construction, and Figure 10 is a top plan view of the embodiment shown in Figure 9, portions being broken away and removed to better illustrate the invention.

As previously mentioned, the present invention is particularly adapted to fill shallow containers or trays 10 with fruit in a predetermined pattern. The trays may be of any suitable design and may be formed of any suitable material such as, for example, papier-mache, metal foil or the like. As shown in Figures 1, 2 and 3, the tray 10 herein disclosed for use with the invention is provided with a plurality of spaced-apart shallow pockets arranged in rows and in staggered relation and each pocket is adapted to receive a piece of fruit in a manner to be disclosed.

Although a tray having five rows of pockets with four pockets to a row has been illustrated, it is to be understood that the pocket arrangement shown is illustrative only and that any desirable arrangement may be employed.

As clearly shown in Figure 1, the tray 10 is adapted to be disposed upon a conveyor 11 and transported in the direction of the arrow beneath a filling mechanism generally indicated by the numeral 12. It is presently preferred to move the conveyor continuously and to successively place trays 10 upon the conveyor so that each tray closely follows its predecessor beneath the filling mechanism 12. While means for placing the trays upon the conveyor has not been shown, it will be clear that they may be placed upon the conveyor by hand or fed thereto from a hopper or the like by any suitable means.

Referring to Figures 1, 2, and 3, the tray filling mechanism 12 comprises a plurality of upright tubes 13 each adapted to receive and support a plurality of pieces of fruit 14 in single file order (see Figure 3). As best shown in Figure 2, the tubes 13 are arranged in two rows with four tubes to a row, the left-hand row of tubes being aligned with the pockets in rows 1, 3, and 5 of the tray 10 and the right-hand row of tubes being aligned with the pockets in rows 2 and 4 of the tray.

Although not shown in the drawings, the tubes 13 are adapted to be continuously supplied with fruit by means of a hopper, chutes, or any other suitable means in a manner that will be clear.

Escapement means is provided adjacent the lower ends of each of the tubes 13 to control gravitation of fruit through the tubes. As illustrated, the escapement means comprises a rocker 15 having spaced-apart, radially extending portions 16, 17. Each tube 13 is provided with a rocker 15, the rockers for the left-hand tubes being secured to a pivotally supported rocker shaft 18 and the rockers for the right-hand tubes being secured to a pivotally supported rocker shaft 19.

When the rocker 15 is in the full-line position shown in Figure 3, the portion 17 of the rocker 15 engages under the lowermost piece of fruit 14 to hold such piece and the pieces of fruit resting thereon within the tube 13. When the rocker 15 is shifted to the dot-dash position, the lowermost piece of fruit will be released by the portion 17 while the next succeeding piece of fruit will be engaged by the portion 16. Therefore, only the lowermost piece of fruit will be permitted to gravitate from the tube. When the rocker 15 is returned once more to its full-line position, the portion 16 will release the fruit and the fruit will then gravitate downwardly until it is stopped by the portion 17.

The means employed by the present embodiment for rocking the rocker shafts 18, 19 and effecting operation of the rockers 15 carried thereby may be seen in Figures 1, 2, and 4. As shown, a lever 20 is secured to the shaft 18 and a lever 21 is secured to the shaft 19, each lever being engageable with the periphery of respective cams 22, 23 secured to the shaft 24 of a drive unit 25.

The periphery of cam 22 is provided with notches 26, 27, and 28 and the periphery of cam 23 is provided with notches 29 and 30. Each of the rocker shafts 18, 19 is spring-biased to urge the respective levers 20, 21 (with reference to Figure 4) from the full-line position shown to the dot-dash line position; however, the levers 20, 21 are normally held in the full-line position because of their engagement with the peripheries of their respective cams.

Rotation of the shaft 24 by the drive unit 25 will effect rotation of the cams 22, 23 in the direction of the arrow. As will be clear, when one of the notches in a cam registers with the respective lever engaged with that cam, the lever will be spring-shifted to its dot-dash position thereby rocking its rocker shaft and the rockers 15 carried thereby. Continued rotation of the cam will obviously return the lever to the periphery of the cam to await the next notch.

Since the cam 22 is provided with three notches, the rockers 15 carried by the shaft 18 will be actuated three times with every complete revolution of the shaft 24. The cam 23 is provided with only two notches and the rockers 15 carried by the shaft 19 will therefore be actuated twice with every complete revolution of the shaft 24.

Although not shown, the drive unit 25 may comprise an electric motor geared to drive the shaft 24 at a predetermined speed synchronized with the speed of the conveyor 11. The unit 25 may also comprise any suitable, commercially available means for stopping the cams 22, 23 in the position shown in Figures 1 and 4 after one complete revolution.

Assuming that each of the tubes 13 has been filled with fruit and that a continuous supply thereto is assured by means of a hopper or the like, operation of my invention is as follows: The conveyor 11 will be energized and trays 10 successively placed upon the moving conveyor by any suitable means. As the first tray reaches the tray filling mechanism 12, it will trip a switch 31 by means of engagement with an actuating member 32 which is disposed in the path of the tray.

The switch 31 will cause the drive unit 25 to rotate the shaft 24 and cams 22, 23 secured thereto. As soon as cam 23 has rotated sufficiently to bring notch 29 into alignment with lever 21, the lever will be snapped to its dot-dash position (by means of the aforementioned spring not shown) together with the rockers 15 carried by the shaft 19. This will allow the lowermost pieces of fruit carried by the right-hand row of tubes 13 to gravitate into the respective pockets in row 2 (See Figure 2) of the tray 10. It will be understood that the tray 10 has been moved by the conveyor a sufficient amount so that the pockets in row 2 of the tray are precisely aligned with the right-hand tubes 13 when the lever 21 drops into the notch 29.

Movement of the tray 10 by the conveyor 11 in the direction of the arrow and rotation of the shaft 24 by the drive unit 25, in synchronization with the conveyor, will continue, the lever 20 dropping into notch 26 when the pockets in row 1 of the tray 10 are aligned with the left-hand tubes 13. This will allow the lowermost pieces of fruit in the left-hand tubes to gravitate into the tray in the manner described.

Filling the tray 10 as it passes beneath the mechanism 12 will continue as described above, the pockets in row 4 next being filled by the right-hand tubes 13 as the lever 21 drops into notch 30 and the pockets in rows 3 and 5 subsequently being filled in sequence by the left-hand tubes as the lever 20 drops into notches 27 and 28.

After the tray 10 has passed beyond the filling mechanism 12, the switch actuating member 32 will return to the position shown in Figure 1. This will cause the drive unit 25 to stop the cams 22, 23 in the position shown in Figure 4 until another tray 10 once again trips the actuating member.

Figures 5 through 8 illustrate another embodiment of my invention wherein a plurality of tubes 13a, corresponding in number and position to the arrangement of the pockets in a tray 10a, are adapted to substantially simultaneously fill each pocket in the tray as the tray is transported beneath the tubes by a conveyor 11a. The tubes 13a are adapted to be continuously supplied with fruit in a manner similar to the tubes 13 heretofore described.

As shown in Figure 7, the means for controlling flow of fruit through each of the tubes 13a comprises a pair of spaced-apart, flattened annular rings 33 and 34 disposed adjacent the lower end of each of the tubes. Each ring is formed of a flexible material, such as rubber or the like, and all of the lower rings 33 are adapted to be connected together by means of conduits 35 and all of the upper rings 34 are adapted to be connected together by means of conduits 36.

The upper rings 34 and lower rings 33 are adapted to be selectively inflated by air under pressure, the rings 33 normally being inflated as shown so as to hold the lowermost piece of fruit 14a in its respective tube.

As shown in Figure 8, a solenoid operated valve 37 is presently employed to selectively inflate the upper and lower rings. The valve 37 is normally held by a spring (not shown) or other suitable means in the full-line position shown wherein the conduits 36 of the rings 34 are connected to exhaust and the conduits 35 of the rings 33 are connected to a source of air pressure.

When an electrical circuit is completed to the solenoid 38 of the valve 37, such as by means of a switch 39, the spool of the valve will shift to the dotted line position wherein conduits 35 will be connected to exhaust and conduits 36 will be connected to the source of air pressure.

Operation of the embodiment shown in Figures 5 through 8 is as follows: When a tray 10a has been transported beneath the tubes 13a by the conveyor 11a, the tray will trip switch 39 and complete the electrical circuit to the solenoid 38 as before described. This will deflate all of the rings 33 and simultaneously inflate all of the rings 34. Since the tubes 33, 34 are normally flat, deflation of rings 33 will cause such rings to flatten and thus permit the lowermost piece of fruit 14a, to gravitate from each of the tubes 13a to a respective pocket in the tray 10a. Obviously, inflation of rings 34 will hold the fruit above the lowermost piece of fruit within respective tubes so that only one piece of fruit is discharged from each tube.

After the filled tray 10a has passed beyond the tubes 13a, the switch 39 will break the electrical circuit to the solenoid of the valve 37 and the valve will then return to its full-line position. This will inflate tube rings 33 and deflate and flatten rings 34 so as to allow the fruit to be held once again by rings 33 in position for the next cycle.

Figures 9 and 10 illustrate still another embodiment of my invention wherein a drum 40 having a plurality of compartments, each adapted to receive a piece of fruit, is employed to dispense fruit to a tray 10b carried beneath the drum 40 by means of a conveyor 11b. In this embodiment, it is preferred to dispose the tray 10b (similar in all respects to tray 10) longitudinally of the conveyor 11b so that the tray provides alternate rows of pockets, one row having three pockets and the next adjoining row having two pockets.

The drum 40 is provided with a plurality of compartments each adapted to receive a single piece of fruit. As illustrated, the compartments are arranged in rows spaced radially about the drum, alternate rows having two and three compartments, respectively, spaced longitudinally of the drum so that the compartments are in registry with the spacing of the pockets in the tray 10b. As will be clear, each compartment is open at the periphery of the drum to provide for entrance and egress of fruit therefrom.

Fruit is adapted to be fed to the drum by means of a conveyor 41 (see Figure 9); however, if desired, the fruit could also be fed to the drum by means of a hopper or the like.

As shown in Figure 9, an idler belt 42, guided by rollers 43, 44, and 45, is held against a portion of the periphery of the drum 40 to prevent escape of fruit from the compartments in the drum until each compartment opening faces in a downward direction. As will be apparent, the belt 42 is preferably driven by frictional engagement with the drum 40.

In the present embodiment, the drum 40 is adapted to be driven by the conveyor 11b through any suitable power transmission means for example, by means of a chain or chains, and sprockets (not shown). It is to be understood that the rotational speed of the drum 40 is so synchronized with the speed of the conveyor 11b that the rows of compartments in the drum will be progressively aligned with the rows of pockets in the tray as the tray is transported beneath the drum by the conveyor 11b.

As shown diagrammatically in Figure 10, means are provided for selectively rotating the drum 40 and for stopping the drum at a predetermined position. Such means presently comprises a clutch interposed in the power transmission line between the conveyor 11b and the drum, and a brake operable to stop the drum at a predetermined position.

Operation of the embodiment shown in Figures 9 and 10 is as follows: A tray 10b will be placed upon the moving conveyor 11b by any suitable means and the tray transported beneath the drum 40. When the tray approaches the drum 40 it will trip a switch (not shown) that will disengage the drum brake and engage the drum clutch. This will rotate the drum in the direction of the arrow so that the fruit in each compartment will fall from the drum as each compartment clears the belt 42.

As before mentioned, the relative speed of the drum and the conveyor 11b is such that the rows of compartments in the drum clear the belt 42 just as the corresponding rows of pockets in the tray 10b pass under the drum. It will be clear that each compartment will receive a piece of fruit as the compartment passes under the end of the feed conveyor 41.

As the tray 10b passes from beneath the drum 40, the clutch will be disengaged and the brake will stop the drum in the position shown until another tray is transported beneath the drum.

In view of the foregoing it will be apparent to those skilled in the art that I have accompanied at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. Apparatus for handling fruit and the like, comprising a receptacle which receives and stores fruit in single-file order and comprising a substantially vertically disposed tubular member, a flexible fluid chamber disposed adjacent the open lower end of said member, said chamber, when inflated, at least partially closing the opening at the lower end of said member preventing escape of fruit therefrom and said chamber, when deflated, allowing fruit to gravitate from said member, and means for selectively inflating and deflating said chamber.

2. Apparatus for packing fruit and the like in a container in a predetermined pattern, comprising a plurality of receptacles each of which receives and stores fruit in single file order, each receptacle being disposed above said container and each comprising a substantially vertically disposed tubular member, a flexible fluid chamber disposed adjacent the open lower end of each of said members, each chamber, when inflated, at least partially closing the opening at the lower end of its respective member preventing escape of fruit therefrom and each chamber when deflated, allowing fruit to gravitate from its respective member, and means for selectively inflating and deflating said chambers to control gravitation of fruit from said members to said container.

3. Apparatus for packing fruit and the like in a container in a predetermined pattern, comprising a plurality of receptacles each of which receives and stores fruit in single file order, each receptacle being disposed above said container and each comprising a substantially vertically disposed tubular member, a pair of flexible, spaced-apart fluid chambers disposed adjacent the open lower end of each of said members, each chamber, when inflated, at least partially closing the opening in its respective tubular member to prevent passage of fruit therethrough and each chamber, when deflated, allowing fruit to gravitate through said member, and means for alternately inflating one and deflating the other of said pairs of chambers in predetermined sequence to allow only the lowermost piece of fruit to gravitate from respective receptacles to said container.

4. Apparatus for packing fruit and the like in a container in a predetermined pattern, comprising conveyor means adapted to transport said container, a rotatable drum spaced above said conveyor having a plurality of fruit receiving compartments disposed about its axis in a predetermined pattern, each compartment having an open side provided by discontinuance of the periphery of said drum adjacent respective compartments, and means closing the open side of each compartment and engaging the fruit disposed therein to prevent escape of fruit therefrom during a portion of the movement of each compartment about the drum axis, said means being movable at the same linear speed as the fruit carried by said rotatable drum to avoid scuffing said fruit and each compartment being adapted to receive a piece of fruit when its open side is in upward facing relation, each compartment discharging its piece of fruit into said container as said container is moved beneath said drum when the open side of each compartment is in downward facing relation.

5. Apparatus for packing fruit and the like in a container having a plurality of fruit receiving recesses arranged in longitudinally spaced-apart rows, adjoining rows of recesses being off-set transversely to provide a staggered pattern, comprising means for supporting a plurality of fruit above the container in at least two rows which are staggered to correspond with respective adjoining staggered rows of recesses in said container, means for effecting relative movement between said container and said fruit supporting means, and means for effecting the release of fruit from said supported rows when corresponding rows of recesses of said container are disposed in predetermined position therebelow to permit such rows of fruit to gravitate to supported relation in the recesses in said container.

6. Apparatus for packing fruit and the like in a container having a plurality of fruit receiving recesses arranged in longitudinally spaced-apart rows, adjoining rows being off-set transversely to provide a staggered pattern, comprising means providing a plurality of fruit supporting stations arranged in at least two rows which are staggered to correspond with respective adjoining staggered rows of recesses in said container, means for effecting relative movement between said container and said fruit supporting stations, and means for effecting the release of fruit from said rows of stations when corresponding rows of recesses of said container are disposed in predetermined relation therebelow to permit the rows of fruit supported at said stations to gravitate therefrom to supported relation in the recesses in said container.

7. Apparatus for packing fruit and the like in a container having a plurality of fruit receiving recesses arranged in longitudinally spaced-apart rows, adjoining rows being off-set transversely to provide a staggered pattern, comprising means providing a plurality of generally upright, open bottom receptacles each adapted to receive and store a column of fruit in single file order, said receptacles being arranged in at least two rows which are staggered to correspond with respective adjoining staggered rows of recesses in said container, means adjacent the open bottoms of said receptacles for holding said fruit therein, said means being operable to release only the lowermost piece of fruit therefrom, and means for effecting operation of said holding means to effect the release of the lowermost piece of fruit from said rows of receptacles when corresponding rows of recesses of said container are disposed in predetermined relation therebelow to permit the lowermost pieces of fruit supported in rows in said receptacles to gravitate therefrom to supported relation in the recesses in said container.

8. In the art of packing fruit and the like in a container having a plurality of fruit receiving recesses arranged in longitudinally spaced-apart rows, adjoining rows of recesses being off-set transversely to provide a staggered pattern, the method which comprises releasably supporting a plurality of fruit above the container and in at least two rows which are staggered to correspond with respective adjoining staggered rows of recesses of the container, effecting relative movement between the container and the supported fruit and releasing the supported fruit when a row of recesses of the container is in predetermined position below a supported row of fruit to permit such fruit to move to position in the recesses in the container.

9. Apparatus for packing fruit and the like in a container having a plurality of fruit receiving recesses arranged in longitudinally spaced-apart rows, adjoining rows of recesses being off-set transversely to provide a staggered pattern, comprising means providing a plurality of stations which store fruit in single file order above the container, said stations being arranged in at least two rows which are staggered to correspond with respective adjoining staggered rows of recesses in said container, escapement means normally preventing escape of fruit from said stations, and cam means arranged to selectively actuate said escapement means when said container is properly positioned beneath a row of stations to allow only the lowermost pieces of fruit supported by such row of stations to gravitate to said container.

10. Apparatus for packing fruit and the like in a container in a predetermined pattern, comprising conveyor means for transporting said container, a rotatable drum spaced above said conveyor having a plurality of fruit receiving compartments disposed about its axis in a predetermined pattern, each compartment having an open side provided by discontinuance of the periphery of said drum adjacent respective compartments, and a flexible belt partially encircling said drum and closing the open side of each compartment and engaging the fruit disposed therein to prevent escape of fruit therefrom during a portion of the movement of each compartment about the drum axis, said belt being movable at the same linear speed as the fruit carried by said rotatable drum to avoid scuffing said fruit and each compartment being adapted to receive a piece of fruit when its open side is in upward facing relation, each compartment discharging its fruit into said container as the latter is moved beneath said drum when the open side of each compartment is in downward facing relation.

11. Apparatus for packing fruit and the like in a container having a plurality of fruit receiving recesses arranged in longitudinally spaced-apart rows, adjoining rows of recesses being off-set transversely to provide a staggered pattern, comprising a rotatable drum spaced above the container and having a plurality of fruit receiving compartments arranged in rows extending axially of said drum, said rows being disposed radially about the axis of said drum and the compartments of each row corresponding in number to the recesses in respective rows of said container, adjoining rows of compartments being off-set from each other axially of said drum to provide a staggered pattern which corresponds to the pattern of the recesses of said container, and means for transporting said container beneath said drum in timed sequence with the latter's rotation to position successive rows of recesses of said container beneath successive rows of compartments of said drum, in one position of said drum each compartment receiving a piece of fruit and in another position of said drum each compartment discharging its fruit into said container.

References Cited in the file of this patent

UNITED STATES PATENTS

| | | |
|---|---|---|
| 947,932 | Peckham | Feb. 1, 1910 |
| 952,352 | Pieper | Mar. 15, 1910 |
| 982,092 | Robinson | Jan. 17, 1911 |
| 1,383,623 | Groves | July 5, 1921 |
| 1,384,461 | Halset | July 12, 1921 |
| 1,388,065 | Schmitz | Aug. 16, 1921 |
| 1,773,654 | Van Cleaf | Aug. 19, 1930 |
| 2,110,923 | Taylor | Mar. 15, 1938 |
| 2,363,014 | Nicolle | Nov. 21, 1944 |
| 2,467,278 | Thompson | Apr. 12, 1949 |
| 2,619,869 | Stewart | Dec. 2, 1952 |
| 2,647,670 | Cox | Aug. 4, 1953 |
| 2,701,085 | Davis | Feb. 1, 1955 |